US012676411B2

(12) United States Patent
Meloling et al.

(10) Patent No.: US 12,676,411 B2
(45) Date of Patent: Jul. 7, 2026

(54) ANTENNA ARRAY FEED NETWORK

(71) Applicant: Naval Information Warfare Center Pacific, San Diego, CA (US)

(72) Inventors: John Meloling, San Diego, CA (US); David Hurdsman, San Diego, CA (US); Jacob Rissmiller, San Diego, CA (US); Aldo Monges, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 329 days.

(21) Appl. No.: 18/432,634

(22) Filed: Feb. 5, 2024

(65) Prior Publication Data

US 2025/0253527 A1 Aug. 7, 2025

(51) Int. Cl.
*H01Q 3/36* (2006.01)
*H01Q 3/24* (2006.01)

(52) U.S. Cl.
CPC ................. *H01Q 3/36* (2013.01); *H01Q 3/24* (2013.01)

(58) Field of Classification Search
CPC ................................... H01Q 3/36; H01Q 3/24
USPC .......................................................... 342/371
See application file for complete search history.

(56) References Cited

U.S. PATENT DOCUMENTS

2013/0147664 A1* 6/2013 Lin .......................... H01Q 3/30 342/368
2014/0057576 A1* 2/2014 Monte .................... H01Q 1/125 343/762
2019/0379119 A1* 12/2019 He ........................... H01Q 3/34
2020/0091605 A1* 3/2020 Ngai ...................... H04B 7/084
2023/0095788 A1* 3/2023 Wang ....................... H01Q 3/36 343/702

* cited by examiner

*Primary Examiner* — Samarina Makhdoom
(74) *Attorney, Agent, or Firm* — Naval Information Warfare Center, Pacific; Kyle Eppele

(57) ABSTRACT

An antenna array feed network includes two or more antenna elements, a 180° hybrid coupler, one or more combiners, two or more transceiver systems including a secondary transceiver system with a transceiver, a diplexer, and amplifier with each remaining transceiver system including a transceiver, a diplexer, a directional coupler, a RF switch, a preamplifier, a network circulator, a programmable attenuator, and an amplifier. The two or more antenna elements form an antenna array. The 180° hybrid coupler provides amplitude controlled null steering and two separate RF signals for an individual port of the antenna array. The programmable attenuator provides automated null steering algorithms for the antenna array feed network. The analog phase shifter equalizes magnitudes of a phase of the two more antenna elements. The one or more combiners feed two or more transceiver systems into the 180° hybrid coupler or the antenna elements into the 180° hybrid coupler.

16 Claims, 1 Drawing Sheet

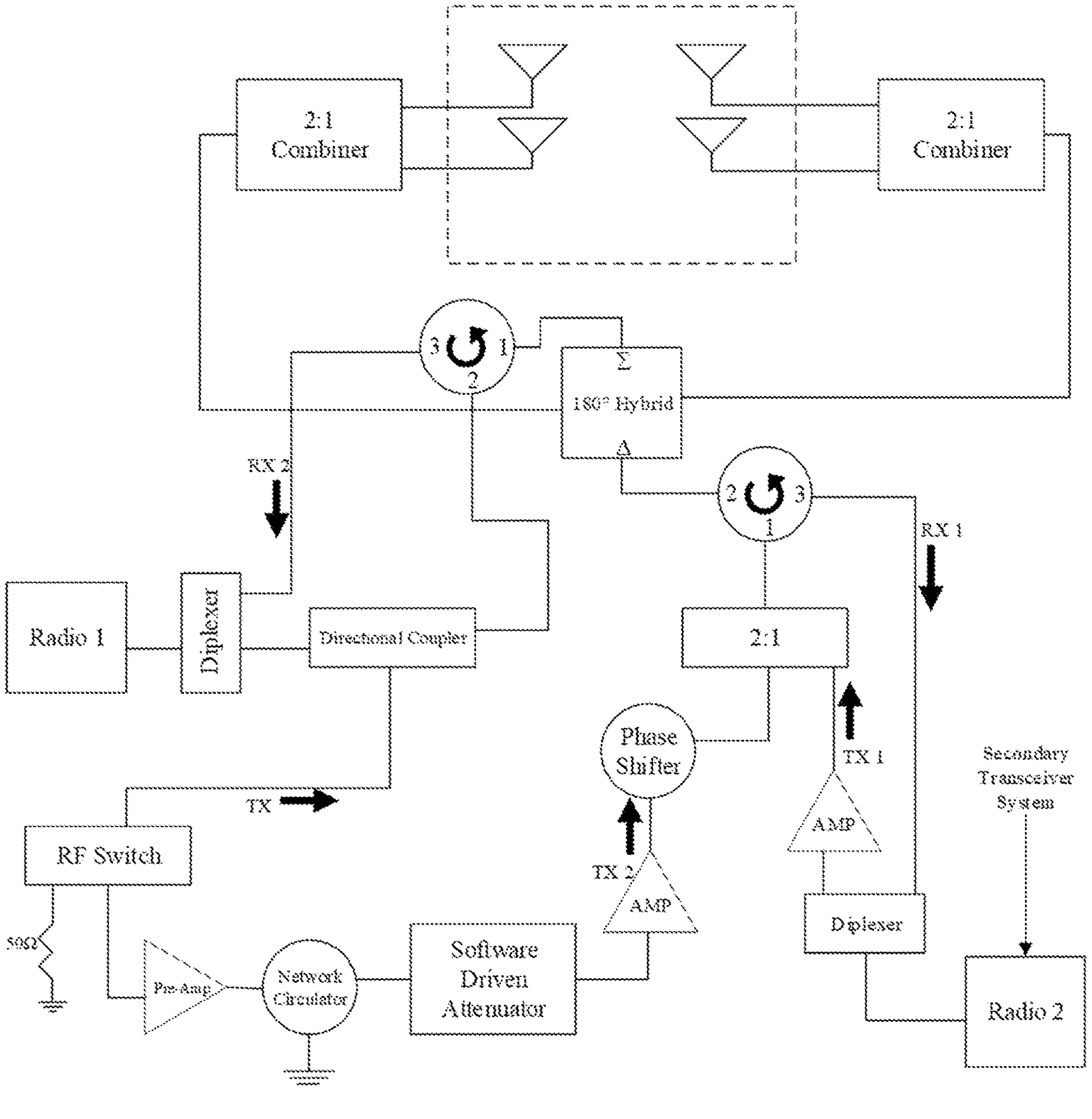
2:1
Combiner
2:1
Combiner
3
1
2
Σ
180° Hybrid
Δ
2
3
1
RX 2
RX 1
Radio 1
Diplexer
Directional Coupler
2:1
Phase
Shifter
TX 1
Secondary
Transceiver
System
TX
AMP
RF Switch
TX 2
AMP
Diplexer
50Ω
Pre-Amp
Network
Circulator
Software
Driven
Attenuator
Radio 2

ANTENNA ARRAY FEED NETWORK

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 210784.

BACKGROUND

Antenna beam forming techniques increase antenna gain and reduce spurious emissions, resulting in an improved communication link reliability and spectrum efficiency. Traditionally, antenna feed networks are classified in the analog or digital domain to produce antenna beamforming. Analog techniques typically use phase shifters at each antenna element of an antenna array. By changing the phase component at each antenna, the beam and nulls from the antenna can be steered in a desired direction. Digital techniques use signal processing to allow for the use of multiple data streams over multiple antenna beams simultaneously. Through this technique, multiple users can be supported on a single frequency channel, resulting in increased spectrum efficiency.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

FIG. 1 is an example of a schematic of the antenna array feed network disclosed herein.

DETAILED DESCRIPTION

Antenna beam forming techniques historically consist of analog or digital RF hardware to condition the phase component to each array element. Analog techniques generally require less complex hardware with no additional signal processing compared to digital techniques. However, analog systems typically only manage one radiofrequency (RF) signal and produce a single antenna beam, and hardware requirements multiply with beamforming angular performance. In contrast, digital techniques typically manage multiple RF signals and produce multiple antenna beams simultaneously with signal processing algorithms. However, digital techniques require significantly more complex hardware and signal processing capabilities compared to analog techniques. As a result, digital techniques are more costly and significantly increase design complexity compared to analog techniques.

The antenna array feed network herein presents an analog technique that can support multiple RF signals and produce multiple antenna beams. The proposed antenna array feed network can support multiple RF signals with lower hardware requirements, no signal processing, and a less complex system design when compared to current digital and analog techniques. Additionally, the antenna array feed network herein has increased spectral efficiency when compared to traditional analog techniques.

The antenna array feed network herein includes two or more antenna elements, a 180° hybrid coupler, one or more combiners, two or more transceiver systems including a secondary transceiver system with a transceiver, a diplexer, and amplifier with each remaining transceiver system including a transceiver, a diplexer, a directional coupler, a RF switch, a preamplifier, a network circulator, a programmable attenuator, and an amplifier. The two or more antenna elements form an antenna array. The 180° hybrid coupler provides amplitude controlled null steering and two separate RF signals for an individual port of the antenna array. The programmable attenuator provides automated null steering algorithms for the antenna array feed network. The amplifier boosts a signal strength of the antenna array to a range of about 25 W to about 100 W. The analog phase shifter equalizes magnitudes of a phase of the two more antenna elements. The one or more combiners feed two or more transceiver systems into the 180° hybrid coupler, one or more antenna elements into the 180° hybrid coupler, or a combination thereof.

Referring now to FIG. 1, a schematic example of the antenna array feed network is shown. In the example shown in FIG. 1, four antenna elements are shown that form an antenna array. However, two or more antenna elements may be present in the antenna array depending on the type of antenna array used. Any type of antenna array may be used herein that the antenna array feed network is connected to. In an example, the antenna array may be an antenna that radiates vertically towards the atmosphere, such as a dipole antenna array, a patch antenna array, or a helical antenna array. In another example, the antenna array may be an antenna array that radiates horizontally, such as a monopole antenna array. In an example, the antenna array supports two antenna beams simultaneously at the same time regardless of the number of transceiver systems that are being used.

Referring back to FIG. 1, the antenna array feed network also includes a 180° hybrid coupler. The 180° hybrid coupler provides amplitude controlled null steering for two antenna beams that produce two separate RF signals for an individual port of the antenna array. The RF signals include two separate transmission and reception RF signals (i.e., data streams) to and from the antenna array feed network. In an example, the two separate RF signals may be operated simultaneously and independently with the individual port of the antenna array. In another example, the two separate RF signals may be operated sequentially or in conjunction with each other. Each RF signal is generated from a RF hardware chain. A RF hardware chain is a combination of RF hardware that supports transmission and reception of an RF signal.

In an example, the 180° hybrid coupler may have two or more ports. In the example shown in FIG. 1, the 180° hybrid coupler has four ports. Two ports include a connection from the 180° hybrid coupler to the antenna array. The other two ports include connections from the 180° hybrid coupler to each of the two RF hardware chains (e.g., A-port/E-port). In an example, the two ports connected to the antenna array have RF signals added in phase though Sigma-port or 180° out-of-phase through Delta-port. Beam forming is enabled by splitting a radio channel between a Sigma-port and a Delta-port of the 180° hybrid coupler. Null steering is enabled by splitting the RF signal between the Sigma-port and the Delta-port of the 180° hybrid coupler. The null steering is controlled by a ratio of Delta-port to Sigma-port input power (A-port/E-port) at the 180° hybrid coupler.

Referring back to FIG. 1, the antenna array feed network also includes one or more combiners. The one or more combiners feed two or more transceiver systems into the 180° hybrid coupler, one or more antenna elements into the 180° hybrid coupler, or a combination thereof. In the example in FIG. 1, there are three combiners where two combiners feed two antenna elements into the 180° hybrid coupler and one combiner that feeds two transceiver systems into the 180° hybrid coupler. In an example, there can be as many transceiver systems as possible as long as the signal strength is maintained at a functional level. In an example, the two or more transceiver systems produce two antenna beams at any given time during operation of the antenna feed network. In the example in FIG. 1, the two separate RF signals are combined by the receiver by feeding one transceiver system into the Delta-port and the other transceiver into the Sigma-port. In an antenna array feed network where more than two transceiver systems are used, a multi-port combiner may be used, such as a 3 to 1 or 4 to 1 combiner.

Referring back to FIG. 1, the antenna array feed network includes two or more transceiver systems. Each transceiver system has an RF signal pathway that includes a RF transmission port and a RF reception port that connects to a RF transmission pathway or a RF reception pathway. In an example, each RF reception port connects directly from the one or more combiners to the diplexer shown as "RX 1" or "RX 2" in FIG. 1 to form the RF reception pathway. In an example, as shown in FIG. 1, one transceiver system is a secondary transceiver system that includes a RF transmission port connected to a first RF transmission pathway with a transceiver, a diplexer, and an amplifier to transmit a first RF transmission signal via a first RF transmission pathway, shown as "TX 1" in the secondary transceiver system in FIG. 1. The secondary transceiver system also has a first RF reception pathway to receive RF reception signals shown as "RX 1" in FIG. 1. Each remaining transceiver system includes a RF transmission port connected to a second RF transmission pathway that includes an additional transceiver and an additional diplexer, an RF switch, a directional coupler, a pre-amplifier, a network circulator, a programmable attenuator, an analog phase shifter, and an amplifier shown as "TX 2" in FIG. 1. Additionally, the remaining transceiver system includes a second RF reception pathway labeled as "RX 2" in FIG. 1.

The two or more transceiver systems include a transceiver or an additional transceiver with a diplexer or additional diplexer. The transceiver or additional transceiver transmits and receives RF signals. The diplexer or additional diplexer splits an RF signal pathway between a RF transmission pathway and an RF reception pathway. The one or more transceivers may be any known transceiver that functions with the antenna array and antenna array feed network. Similarly, the diplexer may be any known diplexer that functions with the antenna array and antenna array feed network. In the example shown in FIG. 1, the secondary transceiver system transmits a first RF signal via a first RF transmission pathway and receives RF signals via a first RF reception pathway. The other transceiver system that begins at "radio 1" transmits a second RF signal via a second RF transmission pathway and receivers RF signals via a second RF reception pathway.

In some examples, one or more circulators (i.e., the circles with arrows and ports 1-3) may be used to connect each transceiver system directly to the 180° hybrid coupler. In the example shown in FIG. 1, a circulator connects each transceiver system directly to the 180° hybrid coupler. In one example, each transceiver has a transmission and reception port that transmits or receives the RF signals (i.e., data streams) through the transceiver system directly to or from the 180° hybrid coupler with no circulators. In another example, as shown in FIG. 1, each transceiver has one port and circulators are used to route transmission and reception RF signals through the transceiver system directly to or from the 180° hybrid coupler. Any known circulator may be used that functions with the antenna array and antenna array feed network.

Referring back to FIG. 1, the antenna array feed network includes an RF switch and a directional coupler. In the example shown in FIG. 1, one of the transceiver systems has the second RF transmission signal routed directly to the combiner via the directional coupler, RF switch, pre-amplifier, and network circulator. In an example, the directional coupler is a three-port device that allows RF energy to flow from port 1 to port 2, while allowing sampling of that same signal from port 1 to port 3 at a reduced power level. In an example, the reduced power level is reduced by about 30 dB. The RF switch enables RF energy to flow between the common port (i.e., the port connected to the directional coupler) to either port 1 or port 2. In the example shown in FIG. 1, port 1 is the null steering RF hardware chain (i.e., transmission pathway). Port 2 is a 50 ohm load, which terminates the signal for disabling null steering when desired. The directional coupler and RF switch route one of the RF transmission signals from a transceiver (i.e., radio 1 or radio 2) to the pre-amplifier. Any known directional coupler and RF switch may be used that functions with the antenna array and antenna array feed network.

Referring back to FIG. 1, the antenna array feed network includes a pre-amplifier that amplifies the second RF transmission signal from the directional coupler and RF switch. The pre-amplifier functions the same as the amplifier described herein to boost the signal of to the minimum input level required by the amplifier. The pre-amplifier enables RF energy (i.e., the RF transmission signal) to flow from the RF switch to the network circulator. Any pre-amplifier may be used that is capable of amplifying one of the RF transmission signals to the minimum input level required by the amplifier.

Referring back to FIG. 1, the antenna array feed network includes a network circulator that routes the second RF transmission signal from the pre-amplifier to a programmable attenuator. The network circulator is a 3-port device that allows RF energy to flow in a clockwise direction. In an example, the network circulator allows RF energy to flow from the pre-amplifier to the programmable attenuator as previously disclosed herein. The network circulator is used to prevent transmit RF signals going back to a receive port on the transceiver. Port 1 to 2, port 2 to 3, and port 3 to 1 allow the second RF transmission signal through. Port 1 to 3, port 2 to 1, or port 3 to 2 provides isolation, which attenuates the second RF transmission signal out.

Referring back to FIG. 1, the ratio (A-port/E-port) is affected by a programmable attenuator and an amplifier at the hybrid's A-port (Delta-port) input. The programmable attenuator (shown in FIG. 1 as Software Driven Attenuator) provides automated null steering algorithms for the antenna array feed network. In an example, the null steering algorithms are operator activated signals and hardware agnostic. The null steering algorithm references a calibration table that provides the attenuation and phase shift setting to produce a null at a desired direction and frequency. The calibration tables are derived through pattern measurements for each antenna system the antenna array feed network is used in. The input power and system loss is used to calculate the amount of programmable attenuation applied. The amplifier boosts a signal strength of the antenna array to a range of about 25 W to about 100 W. The programmable attenuator adjusts the attenuation level, along with the corresponding ratio changes, to adjust the phase differential (y) between two hybrid outputs. Null steering can then be adjusted assuming the phase between both RF hardware chains leading up to the Sigma and Delta-ports are adjusted such that the magnitudes are equal. In an example, any variable attenuator can be used as the programmable attenuator in the antenna feed network.

Referring back to FIG. 1, the antenna array feed network also includes an analog phase shifter. The analog phase shifter equalizes magnitudes of a phase of the two more antenna elements. The analog phase shifter corrects phase differentials due to wiring, connectors, or hardware variance of the Delta-port and the Sigma-port. The phase differential (y) may be represented by the following equation (I):

$$\gamma = |\theta_{output1} - \theta_{output2}| \quad \text{(I)}$$

Once phase adjusted, the phase differential creates a steerable null on the antenna pattern. In an example, a 1 dB change adjusts a null steering by a range of about 0.2° to about 1.2° in the azimuth.

An antenna array feed system is also described herein. The antenna array feed system includes the antenna array feed system includes the same components as previously described herein for the antenna array feed network. The antenna array feed system components function the same as the antenna array feed network components previously described herein.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 to about 20 should be interpreted to include not only the explicitly recited limits of from about 0.1 to about 20, but also to include individual values, such as 3, 7, 13.5, etc., and sub-ranges, such as from about 5 to about 15, etc.

In describing and claiming the examples disclosed herein, the singular forms "a", "an", and "the" include plural referents unless the context clearly dictates otherwise.

What is claimed is:

1. An antenna array feed network with increased gain and reduced spurious emissions comprising:

two or more antenna elements, wherein the two or more antenna elements form an antenna array;

a 180° hybrid coupler, wherein the 180° hybrid coupler provides amplitude controlled null steering for two antenna beams that produce two separate RF signals for an individual port of the antenna array;

one or more combiners, wherein the one or more combiners feed two or more transceiver systems into the 180° hybrid coupler, one or more antenna elements into the 180° hybrid coupler, or a combination thereof;

two or more transceiver systems, wherein the two or more transceiver systems include a secondary transceiver system that includes a first RF reception pathway to receive RF reception signals and a transceiver, a diplexer, and an amplifier to transmit a first RF transmission signal via a first RF transmission pathway and each remaining transceiver system includes:

an additional transceiver and an additional diplexer, wherein the additional transceiver transmits a second RF transmission signal and the additional diplexer splits an RF signal pathway between a second RF transmission pathway and a second RF reception pathway;

a RF switch and a directional coupler, wherein the RF switch and directional coupler route the second RF transmission signal from the remaining transceiver systems to the pre-amplifier;

a pre-amplifier, wherein the pre-amplifier amplifies the second RF transmission signal from the RF switch and directional coupler;

a network circulator, wherein the network circulator routes the second RF transmission signal from the pre-amplifier to a programmable attenuator;

the programmable attenuator, wherein the programmable attenuator provides automated null steering algorithms for the antenna array feed network;

an analog phase shifter, wherein the analog phase shifter equalizes magnitudes of a phase of the two more antenna elements; and an amplifier, wherein the amplifier boosts a signal strength of the antenna array to a range of about 25 W to about 100 W.

2. The antenna array feed network of claim 1, wherein the two separate RF signals are operated simultaneously and independently with the individual port of the antenna array.

3. The antenna array feed network of claim 1, wherein one or more circulators connect each transceiver system directly to the 180° hybrid coupler.

4. The antenna array feed network of claim 1, wherein beam forming is enabled by splitting a radio channel between a Sigma-port and a Delta-port of the 180° hybrid coupler.

5. The antenna array feed network of claim 4, wherein null steering is enabled by splitting the RF signal between the Sigma-port and the Delta-port of the 180° hybrid coupler.

6. The antenna array feed network of claim 5, wherein the null steering is controlled by a ratio of Delta-port to Sigma-port input power at the 180° hybrid coupler.

7. The antenna array feed network of claim 6, wherein the analog phase shifter corrects phase differentials of the Delta-port and the Sigma-port.

8. The antenna array feed network of claim 1, wherein a 1 dB change adjusts a null steering by a range of about 0.2° to about 1.2° in the azimuth.

9. An antenna array feed system with increased gain and reduced spurious emissions, comprising:

two or more antenna elements, wherein the two or more antenna elements form an antenna array;

a 180° hybrid coupler, wherein the 180° hybrid coupler provides amplitude controlled null steering for two antenna beams that produce two separate RF signals for an individual port of the antenna array;

one or more combiners, wherein the one or more combiners feed two or more transceiver systems into the 180° hybrid coupler, one or more antenna elements into the 180° hybrid coupler, or a combination thereof;

two or more transceiver systems, wherein the two or more transceiver systems include a secondary transceiver system that includes a first RF reception pathway to receive RF reception signals and a transceiver, a diplexer, and an amplifier to transmit a first RF transmission signal via a first RF transmission pathway and each remaining transceiver system includes:

an additional transceiver and an additional diplexer, wherein the additional transceiver transmits a second RF transmission signals and the additional diplexer splits an RF signal pathway between a second RF transmission pathway and a second RF reception pathway;

a RF switch and a directional coupler, wherein the RF switch and directional coupler route the second RF transmission signal from the remaining transceiver systems to the pre-amplifier;

a pre-amplifier, wherein the pre-amplifier amplifies the second RF transmission signal from the RF switch and directional coupler;

a network circulator, wherein the network circulator routes the second RF transmission signal from the pre-amplifier to a programmable attenuator;

the programmable attenuator, wherein the programmable attenuator provides automated null steering algorithms for the antenna array feed network;

an analog phase shifter, wherein the analog phase shifter equalizes magnitudes of a phase of the two more antenna elements; and an amplifier, wherein the amplifier boosts a signal strength of the antenna array to a range of about 25 W to about 100 W.

10. The antenna array feed network of claim 9, wherein the two separate RF signals are operated simultaneously and independently with the individual port of the antenna array.

11. The antenna array feed network of claim 9, wherein one or more circulators connect each transceiver system directly to the 180° hybrid coupler.

12. The antenna array feed network of claim 9, wherein beam forming is enabled by splitting a radio channel between a Sigma-port and a Delta-port of the 180° hybrid coupler.

13. The antenna array feed network of claim 12, wherein null steering is enabled by splitting the RF signal between the Sigma-port and the Delta-port of the 180° hybrid coupler.

14. The antenna array feed network of claim 13, wherein the null steering is controlled by a ratio of Delta-port to Sigma-port input power at the 180° hybrid coupler.

15. The antenna array feed network of claim 14, wherein the analog phase shifter corrects phase differentials of the Delta-port and the Sigma-port.

16. The antenna array feed network of claim 11, wherein a 1 dB change adjusts a null steering by a range of about 0.2° to about 1.2° in the azimuth.

* * * * *